UNITED STATES PATENT OFFICE.

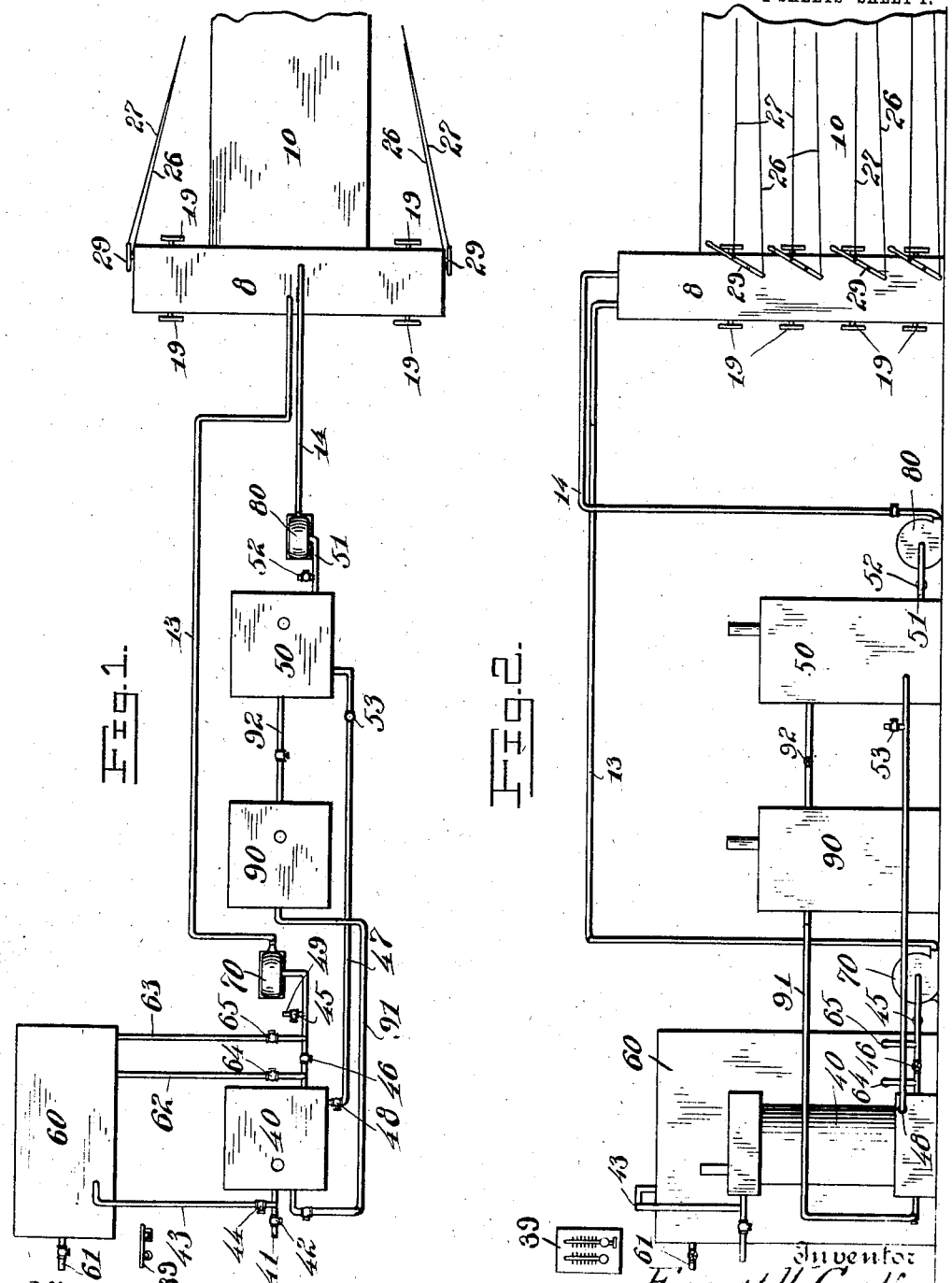

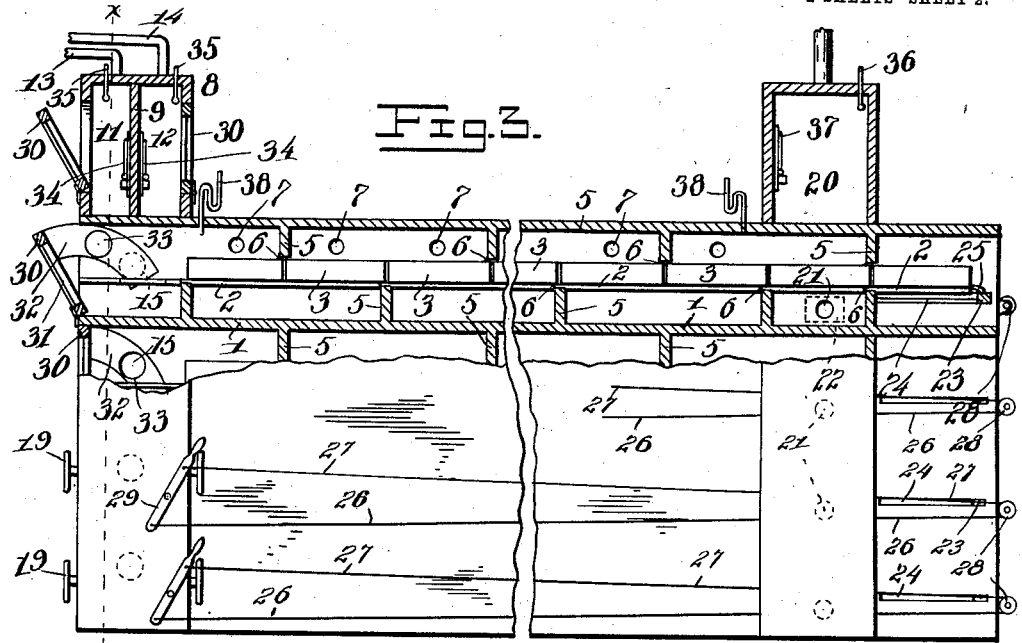
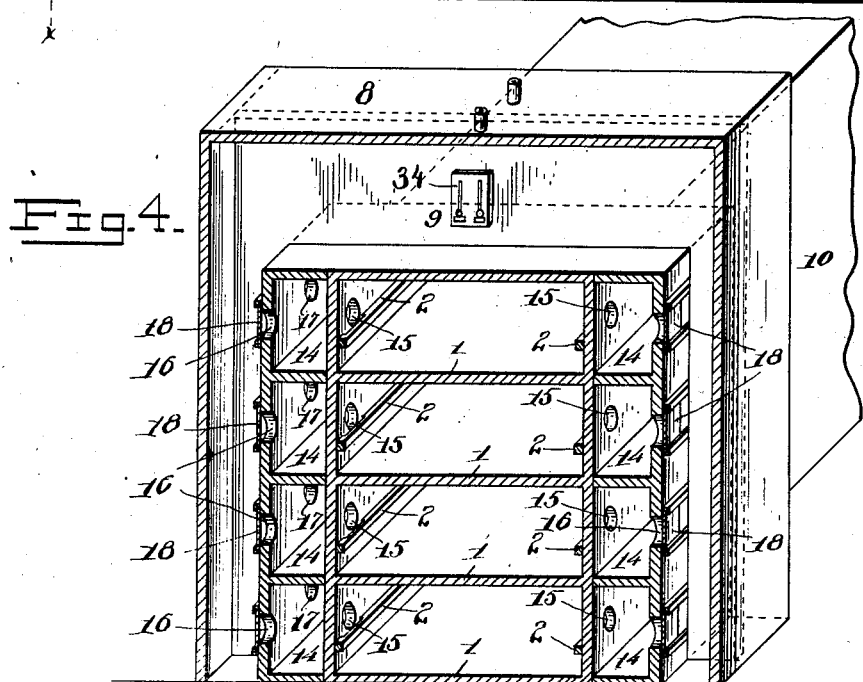

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

DESICCATING PLANT.

No. 841,939.  Specification of Letters Patent.  Patented Jan. 22, 1907.

Application filed May 20, 1904. Serial No. 208,957.

*To all whom it may concern:*

Be it known that I, ERNEST WILLIAM COOKE, a citizen of the United States of America, residing at New York city, in the county of New York and State of New York, have invented certain new and useful Improvements in Desiccating Plants, of which the following is a specification.

My invention relates to apparatus for dehydrating food products, both vegetable and animal; and it consists principally in the improved combinations and arrangements of constituent elements going to make up a complete dehydrating plant, whereby certain novel results and advantages are obtained.

The dehydrating apparatus proper, in which the products are subjected to the action of air, (which is usually previously heated and dried to a greater or less extent,) is of the same general type as that described and claimed in my application for patent filed January 29, 1904, Serial No. 191,558, the same comprising an inclosure in which the products are placed on trays and through which the latter are intermittently fed in the opposite direction to that in which the air is forced through the said inclosure, the construction being such that the air passes entirely through the successive trays and through the products thereon in alternate directions. In other words, it passes upwardly through one tray and downwardly through the next.

In a commercial dehydrating plant, such as that which forms the subject-matter of my present application, provision is made for treating a large quantity of such products simultaneously, and for that purpose a plurality of inclosures are used, each having accommodations for a series of trays and each being provided with independent means to regulate the qualities—that is, the temperature and humidity—of the air which is forced therethrough. These inclosures, which I will hereinafter designate by the word "chambers," may be arranged in any convenient relation to each other; and for the sake of compactness I prefer to mount a number of them in superimposed relation, as illustrated in the drawings forming part of this application. I have shown, by way of example, a tier consisting of four of these chambers; but it will be understood that I am not limited to that or any other number, and also that there may be a plurality of such tiers of chambers arranged side by side or radially around the air drying, heating, and cooling apparatus, hereinafter described, or in any other convenient way.

The term "air" as used in this specification and in the claims means any suitable vapor or gas, as my improved plant is not limited to the use of atmospheric air alone.

One of the most important features of my present invention consists in the means and arrangements of parts which enables me to independently control the temperature, humidity, and pressure of the air supplied to each of said series of trays, so that different products requiring different treatment to properly dehydrate the same can be simultaneously treated in the plant. For this purpose I provide near one end of each dehydrating-chamber an air-mixing box, and each of said mixing-boxes communicates through passages which may be closed at will with a cold-air duct and a hot-air duct, whereby the resulting temperature and humidity of the air mixture admitted from said mixing-boxes to each chamber may be varied as desired. The air is delivered to said ducts by blowers or fans connected by suitable piping to an air-drier, an air-heater, and an air-refrigerator, the connections being so arranged, as will be hereinafter described, that a great variety of effects may be obtained by the simple manipulation of valves.

In the practical operation of a dehydrating plant I have found it to be essential to provide means for ascertaining the humidity of the air at three different points, viz: first, before it enters any of the apparatus—that is, the outside air; second, before it enters the dehydrating-chambers, and, third, as it leaves the dehydrating-chambers.

The employment of three hygrometers at the places indicated for the purpose stated is one of the features of my invention.

Another feature of my invention is the provision of means to independently control the pressure in each tray-compartment.

The construction and arrangement of parts which constitute my invention, as well as the novel results and advantages obtained thereby, are clearly set forth in the following detailed description, in which reference is made to the accompanying two sheets of drawings, in which—

Figure 1 is a diagrammatic plan view of a complete dehydrating plant embodying my invention. Fig. 2 is a diagrammatic side elevation thereof. Fig. 3 is a partial longitudinal section through a tier of chambers in which the material is dehydrated. Fig. 4 is an isometric end view of the tier of chambers with the front end removed substantially on the line $x$ $x$ of Fig. 3, the cut-offs connected to the doors being omitted.

In these views 10 represents a tier of four chambers which are separated from each other by horizontal partitions 1 and each of which is provided on the inner faces of the side walls with tracks or ways 2, on which are guided the trays 3, containing the vegetables or other products to be treated.

As in the apparatus described in my said prior application each chamber is divided into sections of the length of a tray or of two or more trays by transverse partitions 5, alternately extending from the roof and from the floor of the chamber toward the path of the trays, and each partition is provided with a flexible packing-strip 6 on its ends, which contacts with the ends of the trays. Thus when the adjacent ends of two trays are brought in line with one of these partitions the air is prevented from passing along above or below said trays, but is forced to pass down through one and up through the next, thus thoroughly permeating the products upon said trays. Each section, except those at the ends where the air is admitted and removed, is provided with a peep-hole 7, normally closed by a plug.

The front end of the tier of chambers 10 is inclosed on the top and sides by an air-receiving casing 8, which is divided by a vertical partition 9 into two ducts, one of which, 11, constitutes the cold-air duct, and the other, 12, the hot-air duct, and which are supplied with cold and hot air, respectively, by the pipes 13 and 14, leading from the air-drier and other apparatus, as will be hereinafter more fully described. The ducts 11 and 12 extend across the top of the tier of chambers 10 and down the sides thereof, and between the downwardly-extending portions of said ducts and the four chambers are arranged mixing-boxes 14, there being two of said boxes, one on each side, for each chamber—that is to say, eight in all—in the machine shown. Each mixing-box 14 has a passage 15 leading from it to the corresponding chamber, and each mixing-box has also two passages 16 and 17, leading, respectively, into the vertical portions of the said ducts 11 and 12 of the air-receiving casing 8. These last-mentioned passages 16 and 17 are controlled by valves 18, the handles 19 of which project forwardly and rearwardly from the walls of the air-receiving casing 8. In this way the mixture of cold and hot air admitted into each chamber can be independently controlled, as required for the particular material in that chamber. If desired, the end section of each chamber may be used as the mixing-box.

Near the rear end of the tier of chambers 10, which is that end at which the trays containing the products to be treated are inserted, an air-egress casing 20 surrounds the tier of chambers 10, there being a passage 21 leading into the same from each chamber and a valve 22 to control each passage, whereby the pressure of the air in each chamber can be independently regulated.

Various means may be employed to feed the trays 3 through the chambers. That shown consists of a bar 23 for each chamber, the reduced ends of which slide in guide-slots 24 in the sides of the chambers. The bars 23 may be provided with a pair of spring-pressed dogs 25 on their upper surfaces, which in the forward movement of said bars engage the rear end of the tray last inserted and in their backward movement may be depressed to slide under the next tray.

The bars 23 are each connected to two pairs of cords or wires, one pair of which, as 26, passes around guide-rollers 28, journaled on the rear end of the chambers, and then forwardly to the front end of the same, where they are attached to a pair of levers 29, pivoted to the wall of the casing 8. The other pair of cords 27 run directly from the bar 23 to the levers 29, to which they are attached on the other side of the fulcrums of said levers from the cords 26.

It will be seen that by swinging the levers 29 in alternate directions the bars 23 will be reciprocated in their guide-slots 24 and the trays 3 be thus intermittently and successively fed through the chambers.

The front end of each chamber is provided with a door 30, having a window 31 therein and having attached thereto two cut-offs in the form of curved stop-plates 32, each provided with an aperture 33, which when the door is closed coincides with the passage 15, leading from the corresponding mixing-box 14. When the doors 30 are opened, however, for the purpose of removing the trays or otherwise, the stop-plates 32 close the passages 15 and shut off the air, which would otherwise escape into the atmosphere.

The upper parts of the ducts 11 and 12 of the chamber 8 are also provided with glazed doors, as 33, and hygrometers 34 are placed in said compartments so as to be visible through said doors, while thermometers 35 are inserted through the top of said ducts, as shown.

As I have stated, it is very essential for the efficient operation of the apparatus that the qualities of the air be maintained accurately as needed for the particular products under treatment, and for that purpose a thermometer 36 and a hygrometer 37 are placed, as indicated in the drawings, within the egress-casing 20, and pressure-gages 38 are connected to each chamber of the tier of chambers 10. It will be understood that each chamber is provided with such gages, although I have merely indicated those of the uppermost chamber. A hygrometer is also provided to determine the humidity of the outside air, as indicated at 39 in Figs. 1 and 2.

The apparatus for supplying the air to the two ducts 11 and 12 and for imparting to the air the qualities needed for the particular work on hand consists, essentially, of an air-drier 40, an air-heater 50, an air-refrigerator 60, and two blowers or fans 70 and 80.

90 represents a furnace, which, by means of pipes 91 and 92, respectively, furnishes the necessary heat to the air-drier 40 and to the air-heater 50.

The drier 40 takes air either from the atmosphere or other source of vapor through the pipe 41, provided with the valve 42, or else from the refrigerator through the pipe 43, provided with the valve 44.

The drier 40 may be constructed in substantially the same way as the air-drier described and claimed in my application filed February 11, 1904, Serial No. 193,205, but neither the specific construction thereof nor those of the heater and refrigerator form any part of my present invention, which resides, as I have stated, in the combination of the constituent elements forming a complete dehydrating plant, whereby the novel and useful results herein specified are obtained.

After passing through the drier 40 the air may take any one of the following paths or may divide along two of them, as will be described. The pipe 45 leads directly from the drier to the fan 70 and thence through the cold-air pipe 13 to the duct 11 of the air-receiving casing 8. By closing the valve 46 in said pipe 45, however, the air will be diverted and pass through the pipe 62 to the refrigerator 60 and from the latter through the pipe 63 back to the pipe 45 on the other side of the valve 46, and then, as before, through the fan 70 and pipe 13 to the duct 11. Pipes 62 and 63 are provided with valves 64 and 65, respectively. 61 is the air-inlet pipe of the refrigerator, which latter is, of course, connected to some suitable refrigerating plant by piping. (Not shown.)

Another pipe 47, provided with a valve 48 and a branch inlet 53, leads air from the drier to the heater 50, from which the fan 80 draws the heated air through a pipe 51 and delivers it to the hot-air duct 12 of the casing 8 through the pipe 14. The branch inlet 53 of the pipe 47 enables air to be taken directly from the atmosphere through the heater, and pipe 51 is provided with a similar inlet 52, by which atmospheric air can be conveyed into the mixing-boxes through pipe 14. If desired, atmospheric air can also be taken through pipe 13, the pipe 45 being provided with a branch inlet 49.

The arrangement described provides eight different paths for the air-supply—five for the hot air and three for the cold. Any one of the five paths for the hot air can be used simultaneously with either of two of the paths for the cold air, and the third path for the cold air can be used simultaneously with any one of three of the paths for the hot air.

The five different paths for the hot air are as follows, the apparatus being stated in the order in which the air passes through them:

First. The drier, fan 80, duct 12. In this case the air passes through the heater, but the latter is cut off from the furnace. This arrangement is used when a comparatively low temperature is required.

Second. The drier, the heater, fan 80, duct 12. In this case the heater is connected to the furnace. This arrangement furnishes hot and dry air.

Third. The heater, fan 80, duct 12. This arrangement is used when not very dry air is needed or when there is very little humidity in the atmosphere.

Fourth. The refrigerator, the drier, fan 80, duct 12. In this case the refrigerator assists the drier in removing moisture from the air, and the air is not heated to a high temperature.

Fifth. The refrigerator, the drier, the heater, fan 80, duct 12. This arrangement is used when the atmosphere contains much moisture. It furnishes hot and dry air.

The three different paths for the cold-air supply are as follows:

First. The drier, the refrigerator, fan 70, duct 11. This arrangement furnishes dry and cold air.

Second. The refrigerator, fan 70, duct 11. This arrangement does not dry the air.

Third. Fan 70, duct 11. This arrangement is used when the atmosphere is sufficiently cold and dry.

Any one of the five paths for the hot air can be used simultaneously with either the second or third paths for the cold air, and the first path for the cold air can be used simultaneously with any one of the first three paths mentioned for the hot air.

Of course, also, any one of the eight paths mentioned can be used alone, if desired.

It will thus be seen that the amount of hot air and the amount of cold air admitted into the mixing-boxes of each chamber can be varied at will by manipulation of the valves leading from the hot and cold air ducts into said boxes, so that the temperature and humidity of the air in each chamber may be regulated independently of all the other compartments.

Having thus described my invention, which is of course not limited to the precise details of construction or arrangement shown, what I claim, and desire to protect by Letters Patent of the United States, is—

1. A dehydrating apparatus, comprising a plurality of chambers adapted to receive trays containing the products to be treated, an independent air-mixing box for each of said chambers, a hot-air duct and a cold-air duct each leading to said mixing-boxes and means to control the admission of air from each of said ducts to said mixing-boxes.

2. A dehydrating apparatus, comprising a chamber, guideways in said chamber along which trays containing the products to be treated are adapted to be moved, an air-mixing box for said chamber, a hot-air duct and a cold-air duct and means to control the admission of air from each of said ducts to said mixing-box.

3. A dehydrating apparatus, comprising a plurality of chambers adapted to receive the products to be treated, independent means to progressively move trays containing the materials to be treated through each of said chambers, and means to independently control the supply of air to each chamber.

4. A dehydrating apparatus, comprising a plurality of independent chambers, means to feed trays containing the material to be treated through each chamber from one end thereof, means to supply hot and cold air at the other end thereof, including a mixing-box for each chamber and means to independently control the admission of the hot and cold air to each of said mixing-boxes.

5. A dehydrating apparatus, comprising a chamber having an aperture for the admission of air thereto near one end thereof, and constructed and arranged to receive the products to be treated, and a door for said chamber having a cut-off plate rigidly attached thereto to close said aperture when the door is open.

6. A dehydrating apparatus comprising a chamber, a passage to supply air thereto, a door at the end of the chamber and a perforated plate connected to said door and adapted to close said passage when the door is open.

7. A dehydrating apparatus, comprising a plurality of chambers adapted to contain the material to be treated, a mixing-box for each chamber, means to convey currents of air of different qualities into said boxes, a passage leading from each mixing-box into the corresponding chamber, a door for each chamber through which the products can be passed and a cut-off plate connected to each door and provided with an aperture adapted and arranged to coincide with the passage into the mixing-box when the door is closed, said cut-off plates closing said passages when the doors are opened.

8. A dehydrating apparatus, comprising a plurality of independent chambers, guideways in said chambers to receive trays containing the products to be treated, hot and cold air ducts for conveying air to said chambers, air-mixing boxes for each chamber communicating with each of said ducts, each mixing-box having a passage leading into the corresponding chamber, a door at the end of each chamber adjacent to said mixing-boxes, and cut-off plates connected to said doors to close said passages when said doors are opened, said plates having apertures which coincide with said passages when the doors are closed.

9. A dehydrating apparatus, comprising a chamber provided with guideways to receive trays containing the products to be treated, an air-mixing box at one end of said chamber; means to force independent currents of air into said box, independent valves to regulate the admission of said currents of air, a pusher at the other end of said chamber, and means at the first-mentioned end of said chamber to actuate said pusher to intermittently feed the trays through the chamber.

10. A dehydrating apparatus, comprising a tier of superimposed chambers provided with guideways for trays containing the material to be treated, an air-receiving casing surrounding said tier of chambers near one end thereof, means to convey hot and cold air to said casing, an air-mixing box for each chamber communicating with said casing, independent means to regulate the admission of the hot and of the cold air to each of said mixing-boxes, and independent means at the other end of said tier of chambers to feed fresh trays into the chambers.

11. A dehydrating apparatus, comprising a tier of superimposed chambers provided with guideways for trays containing the material to be treated, an air-receiving casing surrounding said tier of chambers near one end thereof, means to convey hot and cold air to said casing, an air-mixing box for each chamber communicating with said casing, independent means to regulate the admission of the hot and of the cold air to each of said mixing-boxes, pushers at the other end of said tier of chambers to feed trays into the latter and independent means at the first-mentioned end of the chambers to actuate said pushers.

12. A dehydrating apparatus comprising a chamber, means to force air into said chamber at one end thereof, a pusher at the other end thereof to progressively feed trays containing the material to be treated through said chamber, means at the first-mentioned end of the chamber to operate said pusher, said means comprising a pair of levers, a cord attached to each lever on one side of its fulcrum and to said pusher, a pair of rollers journaled on the rear end of said chamber and another cord attached to each lever on the other side of its fulcrum, passing around one of said rollers and attached to said pusher.

13. A dehydrating apparatus comprising a tier of superimposed chambers, an air-receiving casing surrounding said tier of chambers near one end thereof, means to convey hot and cold air to said casing, an air-mixing box for each chamber communicating with said casing, independent means to regulate the admission of the hot air and of the cold air to each of said mixing-boxes, a pusher for each chamber adapted and arranged to feed fresh trays thereinto from the other end thereof, independent means at the first-mentioned end of said tier of chambers to independently actuate said pushers, said means consisting of pairs of levers, connected on one side of their fulcrums directly to said pushers, a pair of rollers for each pusher mounted on the end of the corresponding chamber, and connections running from said pushers around said rollers to said levers on the other side of their fulcrum.

14. A dehydrating apparatus comprising a chamber, two air-receiving ducts at one end of said chamber, an air-egress at the other end thereof, means to supply hot and cold air respectively to said air-receiving ducts, a mixing-box communicating therewith and with said chamber, means to independently control the admission of the hot air and of the cold air to said mixing-box from said ducts, and means in said air-egress to control the egress of the air from said chamber.

15. A dehydrating apparatus, comprising a tier of superimposed chambers, guideways in each chamber for trays containing the products to be treated, a pusher at one end of each chamber to feed the trays forward, means at the other end of said tier of chambers to actuate said pushers, two air-ducts surrounding said tier of chambers near said last-mentioned end thereof, means to supply air of different qualities to said ducts, a mixing-box for each of said chambers on each side thereof provided with passages leading into said ducts, and independent valves to control said passages, each of said mixing-boxes having a passage leading into the adjacent chamber.

16. A dehydrating apparatus, comprising a tier of superimposed chambers, guideways in each chamber for trays containing the products to be treated, a pusher at one end of each chamber to feed the trays forward, means at the other end of said tier of chambers to actuate said pushers, two air-ducts surrounding said tier of chambers near said last-mentioned end thereof, means to supply air of different qualities to said ducts, a mixing-box for each of said chambers on each side thereof provided with passages leading into said ducts, independent valves to control said passages, each of said mixing-boxes having a passage leading into the adjacent chamber and independent means near said first-mentioned end to control the egress of the air from each chamber.

17. In a dehydrating plant, the combination with a chamber in which the material is to be treated provided with an air-mixing box, of an air-drier, an air-heater and an air-refrigerator, means to convey one current of air through said drier and heater to said mixing-box and means to convey another current of air through said drier and refrigerator to said box.

18. In a dehydrating plant, the combination with a chamber in which the material is to be treated provided with an air-mixing box, of an air-drier, and an air-refrigerator, means to convey a current of air through said drier and refrigerator to said box, or through said refrigerator alone.

19. In a dehydrating plant, the combination with a chamber in which the material is to be treated, provided with an air-mixing box, of an air-drier, an air-heater and an air-refrigerator, means to convey a current of air through said refrigerator and drier to said mixing-box, or through said drier and refrigerator to said box.

20. In a dehydrating plant, the combination with a chamber in which the material is to be treated provided with an air-mixing box, of an air-drier, an air-heater and an air-refrigerator, means to convey one current of air through said heater to said mixing-box, and means to convey another current of air through said drier and refrigerator to said box.

21. In a dehydrating plant the combination with a chamber in which the material is to be treated, provided with an air-mixing box, of an air-drier, an air-heater, and an air-refrigerator, means to convey one current of air through said drier to said mixing-box and means to convey another current of air through said drier and refrigerator to said box.

22. In a dehydrating plant the combination with a chamber in which the material is to be treated, provided with an air-mixing box, of an air-drier, an air-heater, and an air-refrigerator, means to convey one current of air through said drier to said mixing-box and means to convey another current of air through said refrigerator to said box.

23. In a dehydrating plant the combination with a chamber in which the material is to be treated, provided with an air-mixing box, of an air-drier, an air-heater and an air-refrigerator, means to convey one current of air through said refrigerator, drier and heater to said mixing-box, and means to convey another current of air through said refrigerator to said box.

24. In a dehydrating plant, the combination with a chamber in which the material is to be treated provided with an air-mixing box, of an air-drier, an air-heater and an air-refrigerator, means to convey one current of air through said refrigerator and drier to said mixing-box, and means to convey another current of air through said refrigerator to said box.

25. In a dehydrating plant, the combination with a chamber in which the material is to be treated provided with an air-mixing box, of an air-heater and an air-refrigerator, means to convey one current of air through said heater to said mixing-box, and means to convey another current of air through said refrigerator to said box.

26. In a dehydrating plant the combination with a chamber in which the material is to be treated provided with an air-mixing box, of an air-drier, an air-heater, and an air-refrigerator, means to convey one current of air through said drier to said mixing-box and means to convey another current of air through said refrigerator to said box.

27. In a dehydrating plant, the combination with a chamber in which the material is to be treated provided with an air-mixing box, of an air-drier, an air-heater and an air-refrigerator, means to convey one current of air through said drier and heater to said box and means to convey an independent current of air through said refrigerator to said box.

28. In a dehydrating plant, the combination with a chamber in which the material is to be treated provided with an air-mixing box, of an air-drier, an air-heater and an air-refrigerator, means to convey one current of air through said drier and heater to said mixing-box, and means to convey atmospheric air directly into said box.

29. In a dehydrating plant, the combination with a chamber in which the material is to be treated provided with an air-mixing box, of an air-drier, an air-heater and an air-refrigerator, means to convey one current of air through said refrigerator, drier and heater to said mixing-box, and means to convey atmospheric air directly into said box.

30. In a dehydrating plant, the combination with a chamber in which the material is to be treated provided with an air-mixing box, of an air-drier, an air-heater and an air-refrigerator, means to convey one current of air through said refrigerator and drier to said mixing-box and means to convey atmospheric air directly into said box.

31. In a dehydrating plant, the combination with a chamber in which the material is to be treated provided with an air-mixing box, of an air-drier, an air-heater and an air-refrigerator, means to convey one current of air through said heater to said mixing-box, and means to convey atmospheric air directly into said box.

32. In a dehydrating plant the combination with a chamber in which the material is to be treated provided with an air-mixing box, of an air-drier, an air-heater, and an air-refrigerator, means to convey one current of air through said drier to said mixing-box and means to convey atmospheric air directly into said box.

33. In a dehydrating plant, the combination with a chamber in which the material is to be treated, provided with an air-mixing box, of an air-drier, an air-heater and an air-refrigerator, a cold-air pipe leading into said box, a blower in said pipe, a pipe leading to said blower from said drier, pipes connecting said drier and refrigerator, a pipe connecting said refrigerator and blower, a hot-air pipe leading into said box, a blower in said pipe, a pipe leading to said blower from said heater, a pipe leading from said drier to said heater, and valves in said pipes whereby warm air of different temperatures and degrees of humidity can be conveyed to said box at the same time as cool air of different temperatures and degrees of humidity.

34. In a dehydrating plant, the combination with a chamber in which the material is to be treated provided with an air-mixing box of an air-drier, an air-heater and an air-refrigerator, pipe connections leading from said refrigerator to said drier, and from said drier to said mixing-box, a pipe leading from said drier to said refrigerator and a pipe leading from said refrigerator to said pipe, connections leading from said drier to said heater, and from said heater to said mixing-box, and valves in said pipes whereby one current of air may be caused to pass through the refrigerator, drier and heater, to the mixing-box, while another current of air is passed through the refrigerator or through the drier and refrigerator to said mixing-box.

In testimony whereof I have affixed my signature in presence of two witnesses.

ERNEST WILLIAM COOKE.

Witnesses:
RICHARD N. COTTER,
A. M. LOWEM.